United States Patent [19]

Jackson et al.

[11] Patent Number: 4,546,706
[45] Date of Patent: Oct. 15, 1985

[54] EQUIPMENT MOUNTING STRUCTURE FOR INSIDE BEARING RAILWAY CAR TRUCKS

[75] Inventors: Keith L. Jackson, Creve Coeur; Eugene L. Benner, Des Peres; Richard B. Polley, St. Charles, all of Mo.; James J. Wickman, Granite City, Ill.

[73] Assignee: Lukens General Industries, Inc., Coatesville, Pa.

[21] Appl. No.: 552,925

[22] Filed: Nov. 18, 1983

[51] Int. Cl.$^4$ .................. B60L 5/39; B61F 15/00
[52] U.S. Cl. .................. 105/182 E; 105/221 R; 105/224.1; 191/49
[58] Field of Search .......... 105/157 R, 182 R, 182 E, 105/206 R, 206 A, 218 R, 220, 221 R, 224.1; 191/45 R, 49

[56] References Cited

U.S. PATENT DOCUMENTS

| | | | |
|---|---|---|---|
| 726,600 | 4/1903 | Wheeler et al. | 191/49 X |
| 1,143,500 | 6/1915 | Bullock | 105/206 R |
| 1,517,105 | 11/1924 | Dehler et al. | 105/200 R |
| 3,286,656 | 11/1966 | Lich | 191/49 X |
| 3,509,292 | 4/1970 | Dehn | 191/49 |
| 3,799,065 | 3/1974 | Jackson | 105/182 E |
| 3,817,188 | 6/1974 | Lich | 105/206 R X |
| 3,835,788 | 9/1974 | Paul et al. | 105/182 E |
| 4,108,288 | 8/1978 | Manabe et al. | 191/49 |
| 4,179,995 | 12/1979 | Day | 105/221 R |
| 4,434,719 | 3/1984 | Mekosh, Jr. | 105/218 R X |
| 4,488,495 | 12/1984 | Dean, II | 105/224.1 |

FOREIGN PATENT DOCUMENTS 606753  4/1978  U.S.S.R. .................. 105/206 R

OTHER PUBLICATIONS

"High Performance DMU . . . ", *Railway Gazette International*, Dec. 1979, pp. 1111-1114.

*Primary Examiner*—Robert B. Reeves
*Assistant Examiner*—David F. Hubbuch
*Attorney, Agent, or Firm*—F. Travers Burgess

[57] ABSTRACT

For supporting equipment which must be maintained at constant height above the rails, such as third rail collection gear, on inside bearing trucks in which the truck frame is spring-supported from journal boxes vertically movably mounted in downwardly open pedestal jaws in the truck frame side members, an equipment support beam extends longitudinally of the truck below the frame side members and the beam or pedestal legs are bifurcated at their ends to clear each other and the pedestal tie bars and the beam end portions are suspended from the bottoms of the respective journal boxes at each side of the truck, such that the equipment support beam is constantly maintained at a fixed distance above the rail whereby to maintain the supported equipment, including the third rail shoes, at a constant level with respect to the third rail. To accommodate differential tilting movements of the axles transversely of the truck and differential vertical movements of the axle boxes at the respective sides of the truck, the ends of the beams are supported on longitudinally extending pivotal axes from the respective journal boxes and the pivots are provided with elastomeric bushings.

19 Claims, 9 Drawing Figures

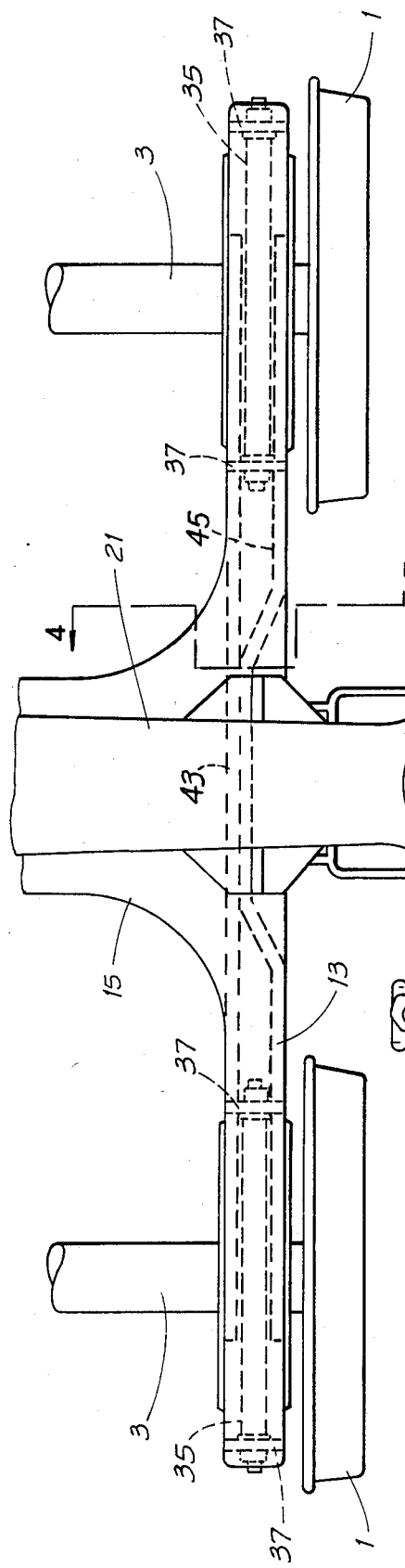
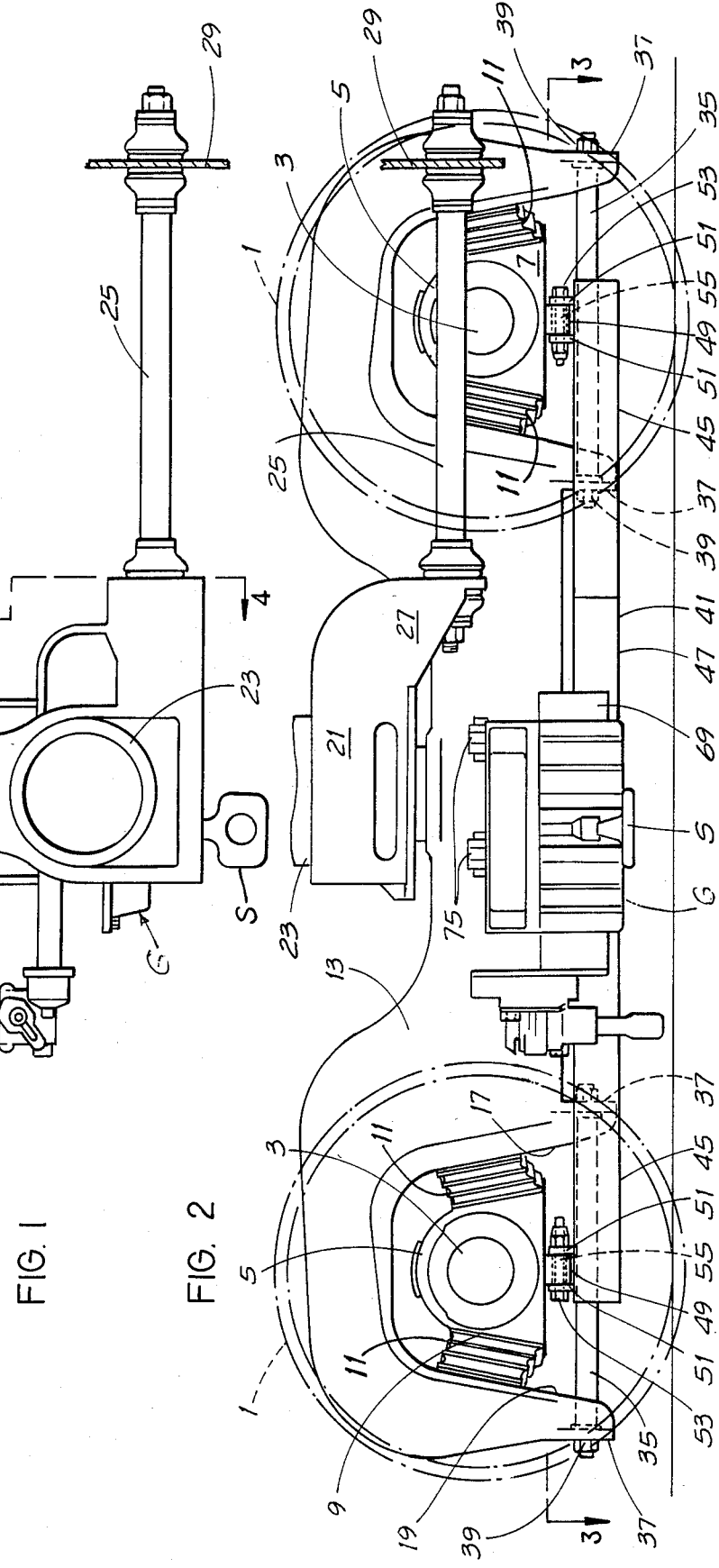
FIG. 1
FIG. 2

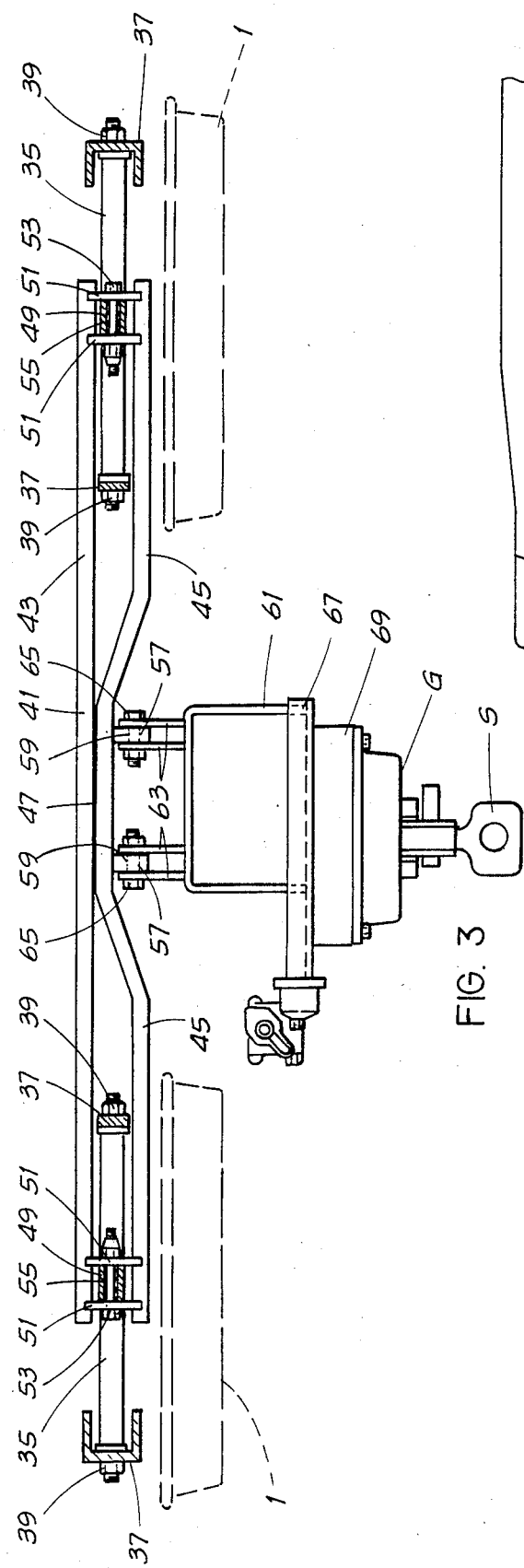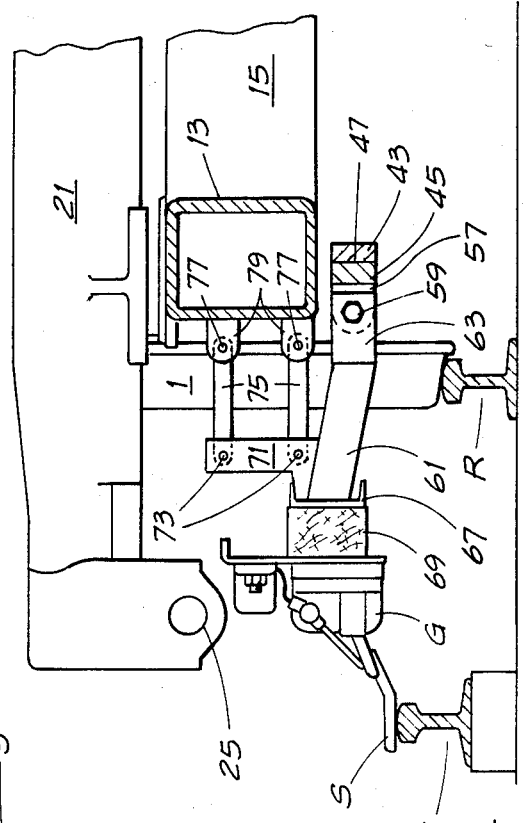

EQUIPMENT MOUNTING STRUCTURE FOR INSIDE BEARING RAILWAY CAR TRUCKS

BACKGROUND OF THE INVENTION

1. Field of the Invention

The invention relates to railway rolling stock and consists particularly in third rail collection gear mounting beam for inside bearing trucks in which the truck frames are spring-supported directly on the journal boxes.

2. The Prior Art

In outside bearing trucks where the truck frame is supported on the journal boxes outboard of the wheels either by springs supported directly on the journal boxes or springs carried by equalizer beams supported at their ends by the journal boxes, third rail collection gear is conventionally mounted on beams supported directly on the outboard journal boxes or on beams mounted directly on the equalizers. For example, in L. Wheeler et al. U.S. Pat. No. 726,600 the third rail shoe beam is supported by brackets secured directly to the journal boxes while in G. H. David U.S. Pat. No. 668,710 the collection gear beam, or insulating block, is supported directly on the equalizers by straps. On some inside bearing trucks, as exemplified in K. J. Jackson U.S. Pat. No. 3,799,065, the third rail collection gear may be mounted on the equalizer beams but on an inside bearing truck without equalizer beams in which the truck frame is spring-supported on the journal boxes there is no structure analgous to the equalizer beam for mounting third rail collection gear and it would be extremely difficult to support it from the inner surfaces of the journal boxes, particularly in a motor truck in which the space between the frame side members is largely occupied by propulsion equipment including motors and gear boxes.

SUMMARY OF THE INVENTION

The invention provides means for supporting third rail collection gear in an inside bearing truck in which the truck frame is spring-supported directly from the journal boxes, in such a manner that the collection gear is maintained at a constant height with respect to the running rails and the contact rail without interference with differential vertical movements of the respective axles and the truck frame and without requiring elimination of pedestal tie bars.

The object is achieved by pendently supporting a longitudinally extending third rail collection beam from the bottoms of the journal boxes at each side of the truck and in one embodiment providing a beam having bifurcated ends embracing the inner pedestal legs and the respective pedestal tie bars with the end portions of the bifurcations supported from the respective journal boxes. In another form of the invention, a solid continuous beam is pendently supported directly from the bottoms of the journal boxes at each side of the truck and the pedestal tie bars and the inner pedestal leg are both bifurcated to permit the location of the collection beam directly beneath the respective journal boxes.

In both forms the means supporting the beams from the boxes comprise pivots on longitudinal axes to freely accommodate differential transverse tilting movements of the axles with respect to each other and with respect to the truck frame, the pivots being elastomerically bushed to accommodate relative vertical movements of the journal boxes at the respective sides of the truck.

The invention also provides means similar to those disclosed in K. L. Jackson U.S. Pat. No. 3,799,065 for stabilizing the third rail collection gear against tipping transversely of the truck.

BRIEF DESCRIPTION OF THE DRAWINGS

FIG. 1 is a plan view of one side of a railway motor truck incorporating the invention.

FIG. 2 is a side elevational view of the truck illustrated in FIG. 1.

FIG. 3 is a horizontal sectional view taken along line 3—3 of FIG. 2.

FIG. 4 is a transverse vertical sectional view taken along the line 4—4 of FIG. 1.

DETAILED DESCRIPTION OF THE INVENTION

Figure 5:
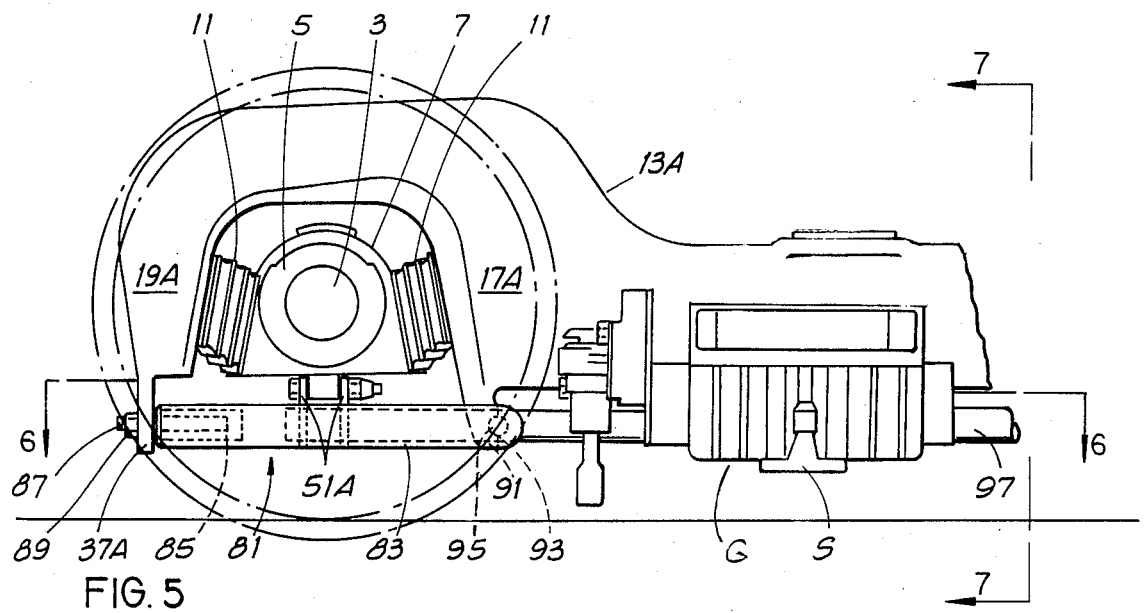
FIG. 5 is a fragmentary elevational view of a portion of the truck showing a modified form of the invention.
Figure 5A:
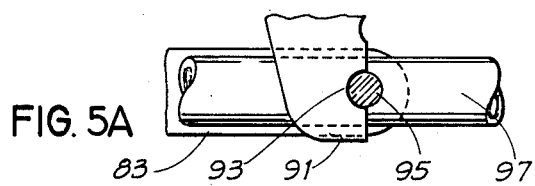
FIG. 5A is a fragmentary longitudinal vertical sectional view along line 5A—5A of FIG. 6.
Figure 6:
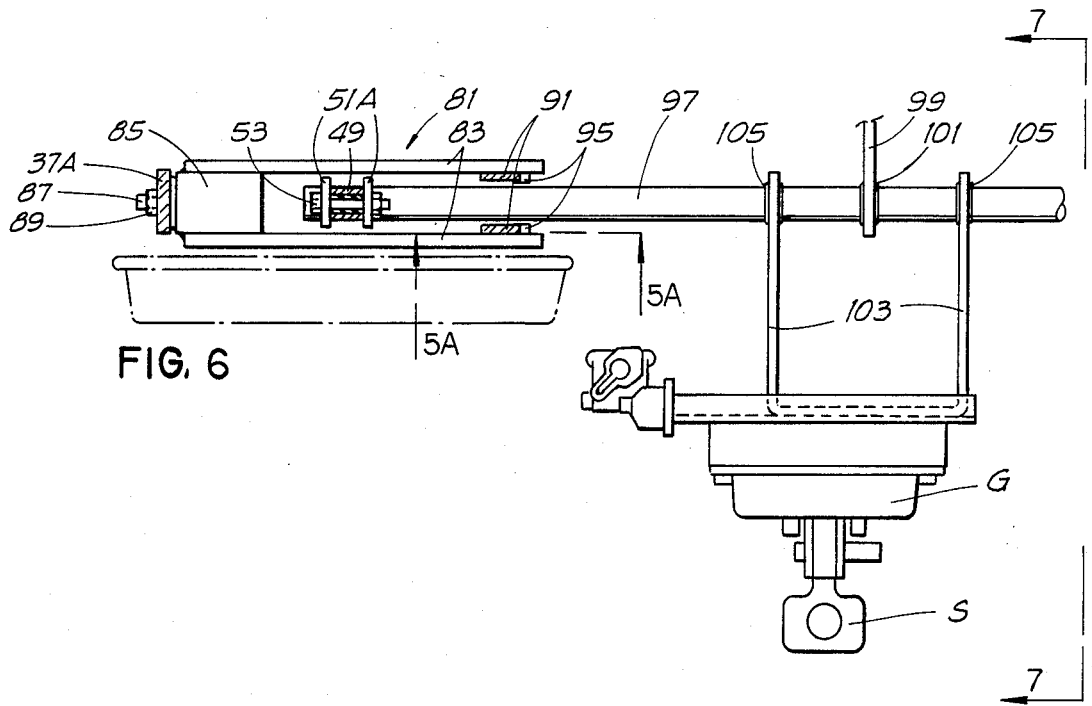
FIG. 6 is a horizontal sectional view taken along line 6—6 of FIG. 5.
Figure 7:
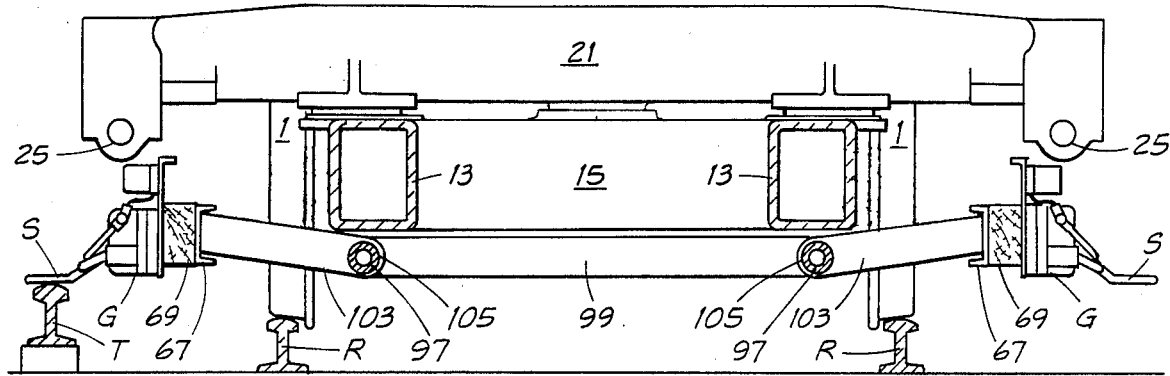
FIG. 7 is a transverse vertical sectional view taken along line 7—7 of FIGS. 5 and 6.

The numeral 1 denotes railway flanged wheels mounted on the ends of railway axles 3 which are rotatably journaled in anti-friction journal boxes 5. Journal boxes 5 mount adapters 7 having sloping sides 9 of shallow V-shape in plan and elastomeric chevron springs 11 are seated on sloping sides 9 of the journal box adapters.

A rigid truck frame has longitudinally extending side members 13 rigidly connected by an integral center transom 15 to form a rigid frame. At their ends, frame side members 13 are formed with downwardly open pedestal jaws having their spaced sides 17 and 19 sloping at the same angles as sloping sides 9 of the journal box adapters 7, pedestal side surfaces 17 and 19 being seated upon the outer and upper surfaces of the elastomeric chevron devices which are yieldable in shear vertically to accommodate such vertical movements of the journal boxes with respect to the frame side members as may be required to cushion the truck frame from vertical impacts received by the wheels from the track rails and also to accommodate the truck to vertical irregularities in the track rails. The central portion of the frame side members nd the entire transom member 15 are depressed to a lower level than the portions of the frame side members containing the pedestal jaws and a truck bolster 21 is swively mounted on the truck frame transom and mounts at its ends outboard of the truck frame side members upright spring devices 23 for yieldably supporting the car body (not shown). For positioning the bolster 21 longitudinally of the car body and transmitting traction and braking forces between the bolster and the car body, longitudinally extending links 25 are connected at their one end to brackets 27 on the bolster and at their other ends to brackets 29 depending from the car body.

In conventional outside bearing trucks, the third rail collector mounting beam is frictionally supported from the outboard journal boxes and on trucks having drop equalizers the third rail collection equipment may be mounted on the equalizers on both inboard and outboard journal trucks. Because it is desirable to maintain the third rail collection gear at a fixed height with respect to the track and the contact rail, it is desirable that the truck member on which it is mounted be unsprung. The present invention provides an unsprung mounting for third rail collection gear on an inside bearing truck of the type described above, in which there are no conventional equalizer beams and the truck frame is directly spring-supported on the journal boxes.

In the embodiment of the invention illustrated in FIGS. 1-4, the pedestal legs bearing surfaces 17 and 19 are tied together at their lower ends by pedestal tie rods 35 which pass through the transverse webs 37 of the respective pedestal legs and are threaded at their ends to receive nuts 39.

A third rail collector mounting beam 41, best seen in FIGS. 2, 3 and 4, is formed from a pair of longitudinally extending bars 43 and 45, the central portions of which are secured to each other at 47 and the outer bar 45 of which is bent slightly outwardly at its ends to form bifurcated end portions on beam 41 so as to permit the extremities of beam 41 to be supported directly from the bottoms of the respective journal boxes 7 without interference with the inner pedestal leg extremities 37 or pedestal tie rods 35. For supporting beam 41 from the journal boxes 7, the latter are formed with a central depending boss 49 and a pair of ears 51 are secured to the bars 43 and 45 near the ends thereof fore and aft of the respective journal box bosses 49 and a longitudinally extending bolt 53 passes through the ears 51 and the respective bosses 49, there being an elastomeric bushing 55 surrounding bolts 53 in bosses 49. With this arrangement, it will be seen that beams 41 are permitted some rotational movement about the axes of bolts 53 with respect to the journal boxes and a slight amount of pivotal movement in the longitudinal vertical plane passing through the axes of bolts 53 through distortion in elastomeric bushings 55, but that the ends of the beam 41 will always be a fixed distance above the rail because of their direct support from the bottoms of the journal boxes. The The indented central portion of bar 45 mounts a pair of longitudinally spaced outwardly extending bosses 57, each perforated at 59 in a direction extending longitudinally of the truck and a generally rectangular frame 61 is formed with pairs of inboard arms 63, the inner terminals of which embrace the respective bosses 57 and are perforated to receive bolts 65 which also pass through perforations 59 in bosses 57, such that frame 61 is free to pivot about the axes of bolts 65. The outer sides of rectangular framing 61 is formed by an inwardly open channel member 67 to the web of which is secured a block 69 of wood or other dielectric material and the third rail collection gear G including third rail shoe S is mounted on the outer surface of block 69. For stabilizing the third rail collection gear against tipping about a longitudinal axis, a pair of upstanding members 71 are secured to channel member 67 inwardly thereof and are formed with vertically spaced pivotal connections 73 on longitudinal axes to parallel vertical spaced transversely extending links 75, the inner extremities of which are pivotally connected at 77 to clevis brackets 79 projecting outwardly from truck frame side member 13.

Operation of the embodiment of the invention shown in FIGS. 1-4 is as follows: As the truck moves along the track, vertical changes in the track rails are accommodated by vertical deflection of chevron spring devices 11 so that even though the truck frame moves vertically with respect to the track when the chevron spring devices are deflected, the journal boxes 7 remain at a constant height from the rail as do the third rail collector gear mounting beams 41 since the latter are suspended directly by means of bosses 49, ears 51 and bolts 53 from the respective journal boxes 7, differences in height of the respective journal boxes at each side of the truck being accommodated through yielding of the elastomeric bushings 55 between bolts 53 and journal box bosses 49 and differential tilting of the respective axles 3 and the journal boxes mounted thereon transversely of the truck being accommodated by pivoting between ears 51 and bosses 49 about bolts 53. Thus, beams 41 are always maintained at a constant height above the track rails and the third rail collection gear G is maintained at a constant level with respect to the third rail T. With this arrangement, constant contact at substantially constant pressure is assured between the third rail shoe S and the third rail T, thus providing optimum contact conditions at all times.

In the embodiment of the invention shown in FIGS. 5-8, the truck frame side member 13A is substantially identical to that of the previous embodiment except for modifications of the lower ends of the pedestal legs 17A and 19A, which are modified to mount bifurcated pedestal tie bars generally indicated at 81. Each tie bar 81 consists of a pair of longitudinally extending side bars 83 welded to the opposite sides of an end block 85, which mounts a longitudinally extending stud 87. For securing the tie bar 81 to transverse web 37A which forms the lower extremity of the respective pedestal leg 19A, stud 87 passes through a hole in web 37A and is secured thereto by an nut 89. The respective pedestal leg 17A is bifurcated at its lower end by elimination of transverse web structure so that only a pair of transversely spaced extensions 91 of the side walls of pedestal legs 17A remain and these are formed with aligned longitudinally extending notches 93 open toward the center of the truck, which receive inwardly extending transverse bosses 95 on side bars 83 so that when nut 89 is tightened on stud 87, bosses 95 are firmly seated in notches 93 to tie the pedestal legs securely together. With this arrangement, the third rail collection gear supporting beam comprises continuous tube 97 which passes between the inner and outer walls 91 of the terminals of inner pedestal legs 17A and mounts upstanding ears 51A connected by bolts 53 to bosses 49 depending from journal box adapters 7 in the same manner as described heretofore relative to the embodiment of FIGS. 1-4.

Figure 8:
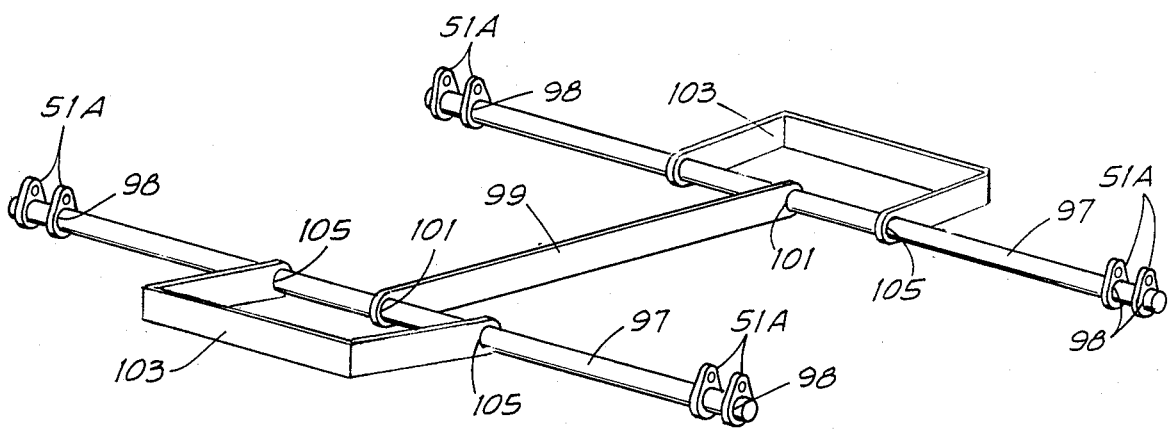
FIG. 8 is a perspective view of the equipment support structure shown in FIGS. 5-7.

Ears 51A are preferably formed with apertures receiving the tube 97 to which they are welded at 98 (FIG. 8). Intermedite the ends of tubes 97 a transversely extending flex plate 99 is welded at its ends to the tubes at opposite sides of the truck at 101, 101 so that the tubes 97 are held against rotation about their respective longitudinal axes while plate 99 flexes sufficiently to permit the tubes 97 at opposite sides of the truck to tilt longitudinally of the truck to accommodate different vertical positions of the journal boxes resulting from vertical irregularities in the track rails. For supporting the third rail collection gear, substantially U-shaped plates 103 are formed at their inner terminals with circular apertures through which the respective tube 97 passes and U-shaped plates 103 are welded at their ends at 105 to the respective tubes 97. Since tubes 97 are held against rotation about their axes by flex plate 99, U-shaped plates 103 and the third rail collector gear G supported thereby will always remain at a constant height with respect to the track rails and the contact rail.

As in the previous embodiment, the modified collector beam 97, because of its suspension directly from the respective journal box adapters, will be maintained at substantially constant height from the track rails irrespective of vertical deflections of the chevron spring devices 11, interference between the collector beam and the pedestal tie bar 81 in this instance being obviated by the bifurcated construction of the pedestal tie bar to accommodate the continuous unbifurcated beam 97.

The details of the construction may be varied substantially without departing from the spirit of the invention and the exclusive use of those modifications as come within the scope of the appended claims is contemplated.

We claim:

1. In a railway vehicle truck, a pair of wheel and axle assemblies, journal boxes supported on the end portions of said assemblies, a rigid truck frame having side members with pairs of depending legs spaced apart longitudinally of the truck forming downwardly open pedestal jaws vertically movably receiving said journal boxes, resilient elements supporting said frame directly from said journal boxes, beam means elongated longitudinally of the truck for stably supporting equipment at a constant height above the track rails, structure suspending said beam means at their ends from the journal boxes at the respective sides of the truck, and pedestal tie means extending across said pedestal jaws and connecting the lower extremities of said pedestal legs, one of said means at each side of the truck being bifurcated whereby to avoid interference between said beam means and said pedestal tie means and thereby to accommodate suspension of said beam means from said journal boxes.

2. In a railway vehicle truck according to claim 1, said suspending structure having cooperating longitudinal axis pivot forming elements on the journal boxes and the respective ends of said beam means, there being yielding bushings between said pivot forming elements to accommodate limited pivotal movements of said beam means relative to the respective journal boxes about axes transverse of the truck.

3. In a railway vehicle truck according to claim 2, said suspending structure pivot forming element at each end of said beam means comprising a boss depending from the respective journal box and having a cylindrical aperture extending longitudinally of the truck and a pair of upstanding ears on the respective end of said beam means and spaced apart longitudinally thereof a sufficient distance to receive said journal box depending boss, said ears being formed with circular apertures co-axial with the respective journal box boss cylindrical aperture, and a cylindrical element extending longitudinally of the truck between said ears and rotatably received in said cylindrical aperture, said yielding bushing being an elastomeric bushing between said cylindrical element and said cylindrical aperture in said boss.

4. In a railway vehicle truck according to claim 1, said pedestal tie means at each said pedestal comprising a rod extending continuously between the legs of the respective pedestal, the end portions of said beam means being bifurcated to pass around the leg of each of said pedestal jaws nearer the center of the truck and said rod.

5. In a railway vehicle truck according to claim 4, said beam means comprising a pair of bars extending generally parallel with each other longitudinally of the truck, the middle portions of said bars being in abutting relation with each other and secured to each other and the end portions of said bars being spaced transversely of the truck from each other to define the bifurcated end portions of said beam means.

6. In a railway vehicle truck according to claim 5, the transversely inner bar being straight and the transversely outer bar being indented inwardly intermediate its ends into abutting engagement with the inner bar.

7. In a railway vehicle truck according to claim 6, transversely outwardly extending arms pivoted to said beam means in the indented portion of said outer bars on axes longitudinal of the truck, and equipment mounting structure secured to said arms at their outer ends.

8. In a railway vehicle truck according to claim 1, said pedestal tie means of each pedestal comprising a pair of longitudinally extending transversely spaced tie bars secured at their respective ends to the legs of the respective pedestals, the pedestal leg ends nearer the center of the truck being bifurcated and each said beam means comprising a continuous beam having its end portions passing through the bifurcated ends of the pedestal legs and between the transversely spaced bars.

9. In a railway vehicle truck according to claim 8, each said beam being of cylindrical cross section through its length.

10. In a railway vehicle truck according to claim 9, said beam being a hollow tubular member.

11. In a railway vehicle truck according to claim 8, each of said pedestal tie bars also comprising a transverse connecting member, said transversely spaced bars being permanently secured at their ends nearest the end of the truck to said transverse connecting member and the latter removably connected to the adjacent pedestal leg, the opposite ends of said bars being formed with means for detachable connection to the bifurcated ends of the pedestal legs remote from the end of the truck.

12. In a railway vehicle truck according to claim 11, means for securing the ends of said pedestal tie bars nearest the respective end of the truck to the adjacent pedestal leg comprising a stud on the transverse connecting member and a cooperating hole in the adjacent pedestal leg and a nut threadably mounted on said stud.

13. In a railway vehicle truck according to claim 12, said means for detachably connecting said opposite ends of said tie bars remote from the ends of the truck to the corresponding pedestal legs comprising transverse inwardly extending bosses on the ends of said bars and shallow notches in the longitudinally inwardly facing surfaces of said inner pedestal leg bifurcations receiving said bosses.

14. In a railway vehicle truck according to claim 1, transversely outwardly extending arms pivoted to said beam means intermediate the ends thereof on axes longitudinal of the truck and equipment mounting structure secured to said arms.

15. In a railway vehicle truck according to claim 14, a pair of vertically spaced parallel links extending transversely of the truck and pivotally connected on axes longitudinal of the truck to said truck frame at their one end and pivotally connected on parallel axes to said equipment mounting structure at their other ends, whereby to stabilize said equipment mounting structure against tipping movements transversely of the truck.

16. In a railway vehicle truck according to claim 1, transversely outwardly projecting bracket structure rigidly secured to the respective beam means for supporting said equipment.

17. In a railway vehicle truck according to claim 16, a transversely extending flex plate rigidly secured at its ends to the central regions of said beam means at the opposite sides of the truck, said flex plate having its cross section vertically elongated whereby to resist relative rotational movements about the longitudinal axes of said beam means while being torsionally flexible to accommodate differential tipping of said beam means longitudinally of the truck in accordance with vertical irregularities in the track rails, said equipment being maintained at a constant height from the track rails because of the rigid connections of the bracket structure to said beam means and the resistance provided by said flex plate to rotation of said beam means about their longitudinal axes.

18. In a railway vehicle truck according to claim 1, said equipment comprising third rail current collection gear being supported from said beam means transversely outwardly therefrom.

19. In a railway vehicle truck according to claim 18, means for stabilizing said third rail current collection gear against tipping transversely of the truck.

* * * * *